United States Patent
Dostal et al.

(10) Patent No.: US 12,241,491 B2
(45) Date of Patent: Mar. 4, 2025

(54) SELF-PIERCING RIVET

(71) Applicant: NEWFREY LLC, New Britain, CT (US)

(72) Inventors: Dominik Dostal, Giessen (DE); Matthias Wissling, Giessen (DE); Andreas Schmitt, Giessen (DE); Paul Bartig, Giessen (DE); Joachim Schneider, Giessen (DE)

(73) Assignee: Newfrey LLC, New Britain, CT (US)

( * ) Notice: Subject to any disclaimer, the term of this patent is extended or adjusted under 35 U.S.C. 154(b) by 306 days.

(21) Appl. No.: 17/457,500

(22) Filed: Dec. 3, 2021

(65) Prior Publication Data
US 2022/0090620 A1   Mar. 24, 2022

Related U.S. Application Data

(63) Continuation of application No. PCT/EP2020/059045, filed on Mar. 31, 2020.

(30) Foreign Application Priority Data

Jun. 5, 2019   (EP) .................................. 19178449

(51) Int. Cl.
*F16B 19/08* (2006.01)

(52) U.S. Cl.
CPC ............ *F16B 19/086* (2013.01); *F16B 19/08* (2013.01)

(58) Field of Classification Search
CPC .......... F16B 19/086; F16B 39/00; F16B 5/04; F16B 19/04; F16B 19/06; F16B 19/08; B62D 27/023; B62D 27/02; B21J 15/025
USPC ......... 403/282; 411/176, 501, 502, 503–504, 411/506
See application file for complete search history.

(56) References Cited

U.S. PATENT DOCUMENTS

| | | | | |
|---|---|---|---|---|
| 46,504 | A | * | 2/1865 | Smith ...................... F16B 19/06 411/501 |
| 2,080,220 | A | * | 5/1937 | Butter .................... F16B 19/125 29/524.1 |
| 2,096,598 | A | * | 10/1937 | Sheane ................... F16B 19/10 411/501 |
| 2,302,501 | A | * | 11/1942 | Mears ..................... F16B 19/04 411/501 |

(Continued)

FOREIGN PATENT DOCUMENTS

| | | |
|---|---|---|
| DE | 202005015713 U1 | 12/2005 |
| EP | 1387093 A1 | 2/2004 |

(Continued)

OTHER PUBLICATIONS

International Search Report Dated May 12, 2020 cited in corresponding PCT Application No. PCT/EP2020/059045.

(Continued)

*Primary Examiner* — Roberta S Delisle
(74) *Attorney, Agent, or Firm* — Harness, Dickey & Pierce, P.L.C.

(57) ABSTRACT

A self-piercing rivet with a head and a shank which has a shank diameter (Ds), wherein, at a foot end opposite the head, the shank has an axial recess which has an axial depth (LB), wherein the axial recess has a recess volume, wherein a ratio of recess volume to volume of the shank and the head is in the range of 0.06 to 0.08.

20 Claims, 1 Drawing Sheet

(56) References Cited

U.S. PATENT DOCUMENTS

| | | | | |
|---|---|---|---|---|
| 3,505,923 A * | 4/1970 | Neill | ..................... | F16B 19/06 |
| | | | | 411/501 |
| 4,007,540 A * | 2/1977 | Tyree | ..................... | B21J 15/02 |
| | | | | 29/524.1 |
| 6,325,584 B1 * | 12/2001 | Marko | ..................... | B21J 15/025 |
| | | | | 411/501 |
| 6,385,843 B1 * | 5/2002 | Singh | ..................... | F16B 19/086 |
| | | | | 411/501 |
| 6,662,911 B1 * | 12/2003 | Nugier | ..................... | F16D 69/04 |
| | | | | 188/250 G |
| 6,835,020 B2 * | 12/2004 | Wang | ..................... | B21J 15/025 |
| | | | | 411/501 |
| 7,628,573 B2 * | 12/2009 | Philipskotter | ..................... | F16B 19/086 |
| | | | | 411/501 |
| 8,070,406 B2 * | 12/2011 | Trinick | ..................... | F16B 19/086 |
| | | | | 411/501 |
| 8,506,228 B2 | 8/2013 | Singh et al. | | |
| 8,763,233 B2 * | 7/2014 | Bartig | ..................... | F16B 19/086 |
| | | | | 411/501 |
| 9,573,186 B2 * | 2/2017 | Freis | ..................... | B62D 25/081 |
| 9,803,675 B2 * | 10/2017 | Hofmann | ..................... | F16B 19/06 |
| 10,876,565 B2 * | 12/2020 | Henke | ..................... | F16B 19/086 |
| 2004/0068854 A1 * | 4/2004 | Kato | ..................... | F16B 19/086 |
| | | | | 411/501 |
| 2013/0055549 A1 * | 3/2013 | Auriol | ..................... | B21J 15/02 |
| | | | | 29/525.07 |
| 2013/0340239 A1 * | 12/2013 | Ueda | ..................... | F16B 19/086 |
| | | | | 411/501 |
| 2018/0266465 A1 * | 9/2018 | Heger | ..................... | B21J 15/025 |
| 2019/0078601 A1 | 3/2019 | Bartig et al. | | |

FOREIGN PATENT DOCUMENTS

| | | |
|---|---|---|
| EP | 1229254 B1 | 1/2005 |
| JP | 2009541057 A | 11/2009 |
| WO | 2006087984 A1 | 8/2006 |

OTHER PUBLICATIONS

Lang Lihui et al: "A critical review on special forming processes and associated research for lightweight components based on sheet and tube materials", Manufacturing Review, vol. 1, Sep. 1, 2014 (Sep. 1, 2014), p. 9, XP055647070, DOI: 10.1051/mfreview/2014007 paragraph [02.3].

Office Action regarding corresponding Japanese Application No. 2021-567030, mailed Sep. 2, 2024.

Search Report regarding European Patent Application No. 191784495, dated Dec. 10, 2019.

Japanese Office Action Dated Feb. 15, 2024 cited in corresponding Japanese Application No. 2021-567030.

* cited by examiner

SELF-PIERCING RIVET

CROSS-REFERENCE TO RELATED APPLICATIONS

This application is a continuation of international application PCT/EP2020/059045, filed Mar. 31, 2020 which claims priority from European Patent Application No. 19178449.5, filed Jun. 5, 2019, the disclosures of which are incorporated herein by reference in their entirety.

BACKGROUND OF THE INVENTION

The present disclosure relates to a self-piercing rivet with a head and a shank which has a shank diameter, wherein, at a foot end opposite the head, the shank has an axial recess which has an axial depth, and wherein, at the foot end, the shank comprises an annular piercing end, for the production of a joining connection between at least two workpieces. The self-piercing rivet is in particular directed to thin sheet metal application, notably in the automotive industry.

A self-piercing rivet is partially hollow with a head and a cylindrical shank that terminates in an annular edge. As the rivet is driven into at least two overlapping sheets of material over a suitably shaped die, the shank is caused to flare outwardly. The sheets of material are caused to deform around the shank, creating an annulus that encapsulates the shank. The shank and edge of the rivet remain embedded in the sheet material after the rivet has been set. Self-piercing riveting enables sheet material to be joined without the requirement for the pre-drilling or pre-punching of a hole in the material.

One important parameter for the joining operation as well as the joining quality of the self-piercing rivet joint is the geometry of the self-piercing rivet. In the state of the art numerous different geometries of the self-piercing rivet are known, see e.g. EP 0 720 695, EP 1 064 466, EP 1 229 254, EP 1 387 093, DE 44 31 769, DE 203 19 610 U1, DE 200 01 103 U1, US 2004/0068854 A1, JP 2001159409A, JP 09317730A, W2015086203, WO2014013232 or U.S. Pat. No. 9,316,243 et alia.

Self-piercing riveting as a joining method is widely used in the industry and is currently the main joining method for aluminium and lightweight material automotive structures.

WO2014013232 discloses a method for forming a joint in a stack of at least two sheets of light metal alloy, using a self-piercing rivet that is fully hollow. The rivet is coated at least along a portion of its bore by a lubricant and pierces the upper surface thereof and such that the shank deforms outwardly to interlock with the material but without penetration to the die side of the material. The outside diameter of the shank of the rivet is 5.4 mm or less. The die has a volume that is less than 60% or 70% of the effective solid volume of the rivet.

U.S. Pat. No. 9,316,243 describes a self-piercing rivet comprising a head and a substantially cylindrical shank that is at least partially hollow so as to define a bore that extends along at least part of its length, wherein the outside diameter of the shank is at least 6 mm, the effective length of the rivet is at least 1.3 times the diameter of the shank and the bore has a volume that is at least 38% of the effective solid volume of the rivet. Such rivet is suitable for use with thick stack, high strength light metal alloys such as magnesium and aluminium alloys.

However, for doors applications in vehicles, notably for thin aluminium panels, other processes, such as resistance spot welding, compete with self-piercing riveting. Therefore, a need still exists to increase the joining quality and to develop a self-piercing rivet adapted to join workpieces such as door panels and suitable for a simple manufacturing process.

BRIEF SUMMARY OF THE INVENTION

The above-mentioned object is achieved by the self-piercing rivet defined in independent patent claim 1.

The self-piercing rivet comprises a head and a shank which has a shank diameter, wherein at a foot end opposite the head, the shank has an axial recess which has an axial depth and the shank further comprises an annular piercing edge. The self-piercing rivet is characterized in that the recess has a recess volume, wherein a ratio of recess volume to volume of shank and head is between 0.06 and 0.08.

In other words, the recess has a volume which is between 6% and 8% of the effective solid volume of the rivet or of the total volume of the rivet. Several tests have surprisingly shown that a self-piercing rivet geometry having a ratio of recess volume to volume of shank and head between 0.06 and 0.08 allows to perform a self-piercing rivet having good joining qualities, notably for door panels, and may be easy to manufacture at low costs. Indeed, the geometry and shape of such fastener is similar to the geometry of a clinch rivet or other conventional rivets, allowing an easy manufacturing, but the particular ratio of the rivet according to the present disclosure enables to pierce through the sheets metal and to form an interlock according to the well-known self-piercing method. The self-piercing rivet of the present disclosure thus has at the same time the manufacturing advantages of a clinch rivet although being a self-piercing rivet and providing the joining quality and load bearing capacity of self-piercing rivets known from the state of the art. Thus, such self-piercing rivet is adapted to compete with other joining methods. Such ratio allows a straight upsetting and the spreading through the internal geometry (rivet recess), and not over the outer edge, as known with the rivet from the prior art. The special geometry of the rivet and of its recess allows upsetting and spreading the rivet, without any specific heat or surface treatment. More particularly, no hardening of the rivet is necessary.

Advantageously, the rivet is a cold formed part without any heat or surface treatment. Thus, such self-piercing rivet is easy to manufacture, with a limited number of process steps. The rivet obtains its strength with the cold forming. According to an embodiment, the rivet is manufactured without any hardening step.

Preferably, the recess is arc-shaped. For instance, the recess is at least partly arc-shaped, notably in the area of the recess base, located toward the head. This shape allows a better forming, notably cold-forming and to limit the cold forming steps.

According to an embodiment, a ratio of recess volume to volume of shank and head ranges between 0.064 and 0.077.

According to an embodiment, the axial depth is defined such as to receive a determined amount of material (remaining bottom) and to weaken the self-piercing rivet over a certain height. A ratio of the axial depth to shank diameter may range between 0.05 and 0.66.

According to an embodiment, the annular piercing edge hat a piercing diameter and the ratio of piercing diameter to shank diameter ranges between 0.85 and 0.99, for example between 0.87 and 0.96. Thus the position of the piercing edge enables a correct upsetting and spreading of the rivet.

According to an embodiment, the rivet is made of steel, stainless steel or aluminium alloy. More particularly, a rivet made of an aluminium alloy will be used to join aluminium alloy workpieces. For example, the self-piercing rivet is made of precision steel 37MnB4.

According to an embodiment, the self-piercing rivet is made from a wire having a strength of 750 MPa. Such strength is different from the standard strength used in self-piercing rivets. It allows notably to avoid post treatment of the rivet, but it increases the difficulty of generating a sharp edge during the cold forming.

According to an embodiment, the self-piercing rivet comprises a first section in the vicinity of the head and a second section in the vicinity of the annular piercing edge, wherein the material strength of the second section is lower than the material strength of the first section. Due to the cold forming and the recess geometry, the second section is weakened with regard to the first section.

According to an embodiment, the annular piercing edge comprises an outer edge, and wherein the outer edge is sharp-edged with a radius of less than 0.2 mm, and in particular less than 0.1 mm. This sharp-edged outer edge enables to improve the cutting through aluminium alloy panels or workpieces and can be easily manufactured.

According to an embodiment the recess is at least partly conical or frustroconical, such that the recess comprises a conical taper surface, and wherein the conical taper surface has an inclusive angle in cross section between 75 and 105 degrees, and in particular of 90 degrees. Such recess geometry allows a determined spreading in the workpiece.

The present invention is also directed to a self-piercing riveted joint having an upper workpiece and a lower workpiece from which at least one is realized from a metal, and having a self-piercing rivet as described above, the head of which abuts against the upper workpiece.

According to an embodiment, the upper workpiece and/or the lower workpiece is made of an aluminium alloy. The lower side of the rivet shank is upset and a spreading of the recess geometry of the rivet in the workpiece occurs.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

On the different figures, the same reference signs designate identical or similar elements.

Figure 1:
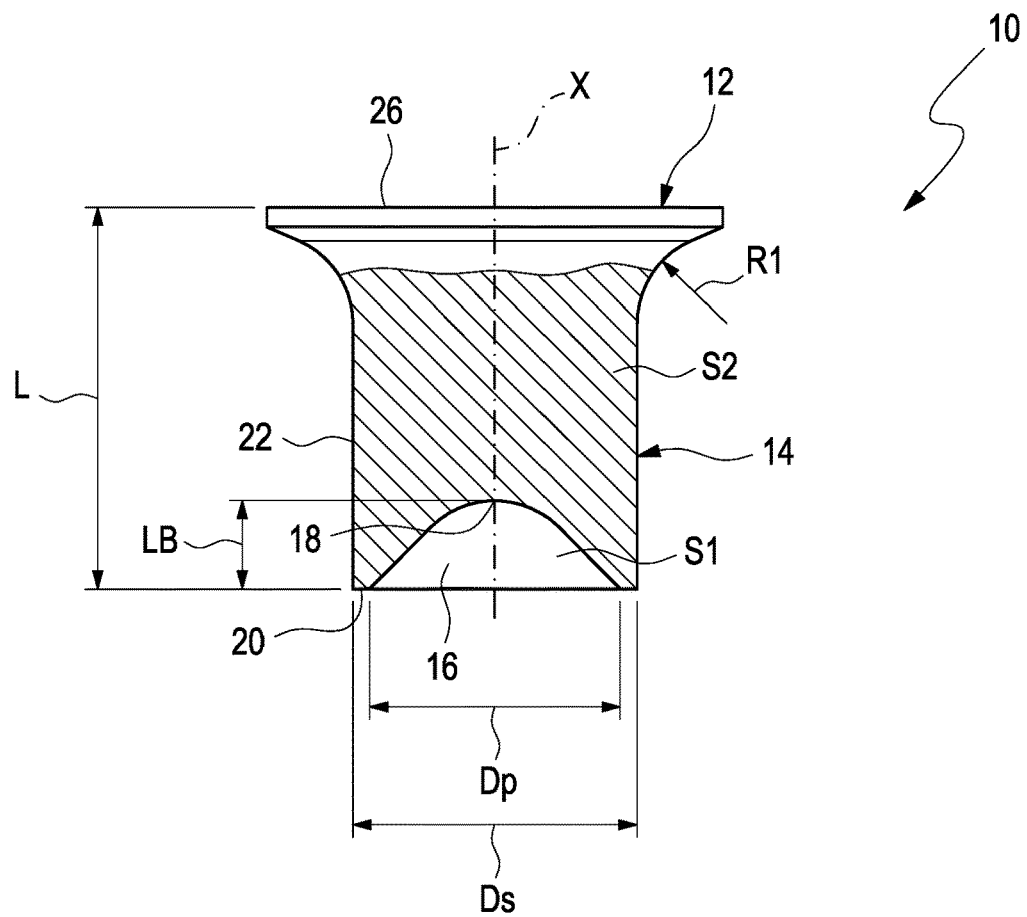
FIG. 1 shows schematically a sectioned view of a self-piercing rivet according to the present invention.
Figure 2:
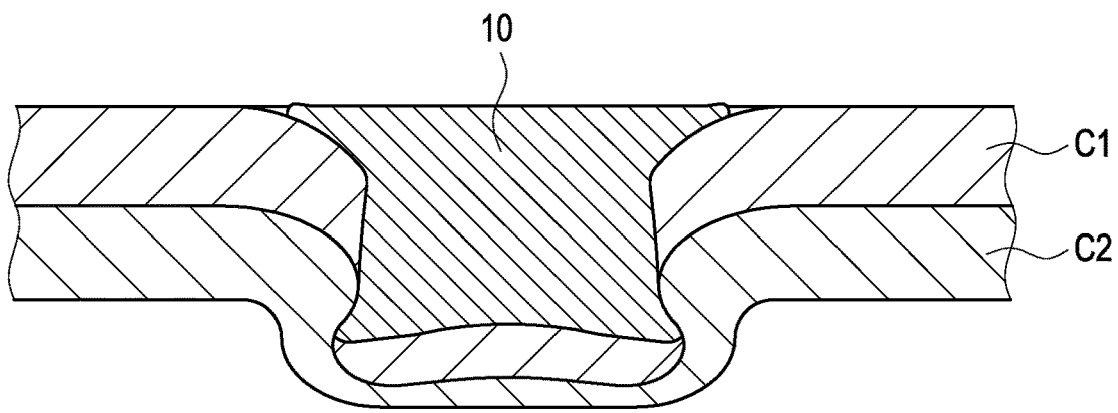
FIG. 2 shows a sectioned view a riveted join using the piercing rivet of FIG. 1.

FIG. 1 shows a self-piercing rivet 10 comprising a rivet head 12 and a rivet shank 14 extending along a longitudinal axis X. The self-piercing rivet 10 is suitable for producing a joining connection between at least two components or workpieces C1, C2, as depicted in FIG. 2. For example, one of the workpieces or the two workpieces may be aluminium workpieces, for instance vehicle door panels.

The rivet shank comprises an axial recess (or central bore) 16 having a base 18. The recess 16 is located at the foot end opposite the head 12. The rivet shank 14 further comprises an annular piercing edge 20 facing away from the rivet head 12. The recess 16 comprises an axial depth LB between the base 18 of the recess 16 and the annular piercing edge 20. More particularly the axial depth LB is the greatest distance along the longitudinal axis X between the base 18 and the annular piercing edge 20. For instance, the axial depth LB is the distance between the most upper point of the surface of the base (in other words the point of the base situated the nearest of the upper surface of the head) and the most lower point of the annular piercing edge. The axial depth is for instance of 1 mm.

The recess 16 has a volume and the geometry of the self-piercing rivet is such that a ratio recess volume to volume of the shank and the head (in other word the entire volume of the solid rivet) is between 0.06 and 0.08 or 0.064 and 0.077. More particularly, the ratio can be of about 0.07. In another embodiment, the ratio can be of about 0.065. The recess volume in this case is calculated starting from the foot end of the self-piercing rivet. The volume of the solid rivet is that volume of the rivet shank 14, of the rivet head 12, inclusive a possible transition section to a head of the self-piercing rivet, and excluding the recess volume which is consequently not contained in the volume of the shank.

The rivet shank 14 comprises a cylindrical shank outer surface 22. The shank outer surface has a shank diameter Ds. The shank has a uniform shank diameter. For instance, the shank diameter may be between 3 and 5 mm, and for example of 3.3 mm or 3.5 mm. A ratio of the axial depth LB to shank diameter Ds can range between 0.05 and 0.66.

The rivet head 12 extends radially outward from the rivet shank 14. The rivet head 12 has an upper portion 26 and a transition region defined between the upper portion 26 and the rivet shank 14. The transition region has a radius of curvature R1 in the range 0.5 to 2 mm, for example a radius of curvature of 1 mm or between 0.9 and 1.1 mm. The upper portion 26 has an upper surface opposite the base 18. The thickness of the upper portion 26 is comprised between 0.1 and 0.3 mm, and is notably of 0.25 mm.

The rivet has a length along the longitudinal axis X. The length of the rivet from the annular piercing edge 20 to the head (and more particularly the upper surface of the upper portion of the head 12) is between 3 and 6 mm, or between 3.5 and 5 mm, and for example of 5 or 5.5 mm.

As illustrated in the drawing, the base 18 can be arc-shaped. For instance, the base can have a radius between 0.05 of the shank diameter and 4 mm. The radius of the base is for instance of 1.3 mm. The base 18 may also be between conical. More particularly, the base can be arc-shaped, and the recess can be partly frustroconical. The recess may comprise conical taper surface having an inclusive angle in cross section between 75 and 105 degrees, and more particularly of 90 degrees.

The annular piercing edge 20 can be a flat shank end face, as depicted in FIG. 1. As shown in FIG. 1, the annular piercing edge comprises an outer edge. The outer edge is sharp-edged with a radius of less than 0.1 mm. The inner edge forms a cutting line comprising a cutting or piercing diameter. The cutting line is as sharp as possible, such that a piercing through the workpieces is done without huge setting forces. The ratio of piercing diameter Dp to shank diameter Ds ranges between 0.85 and 0.99, and more particularly between 0.87 and 0.95.

The annular piercing edge 20 may also be an arcuate shank end face. For example, the annular piercing edge may comprise a circular cutter with a cutting diameter, the circular cutter being formed by a cutting line between a radius or a chamfer in the region of an inside surface of the axial recess and a radius toward a radial outside surface of the shank.

The self-piercing rivet is formed by cold-forming. No heat or surface treatment is applied to the self-piercing rivet 10 after the cold forming. More particularly, no hardening of the self-piercing rivet is undertaken after the cold-forming. Thus, the cold forming gives to the rivet its strength. The self-piercing rivet is for instance made from a wire having a strength of 750 MPa. The manufacturing process through cold forming of self-piercing rivet is well-known by the person skilled in the art and is therefore not detailed.

More particularly, the self-piercing rivet 10 comprises a first section in the vicinity of the head and a second section in the vicinity of the annular piercing edge 20. The strength of the second section is lower than the strength of the first section.

The recess 16 forms a projected surface S1 in a longitudinal cross section plan (as illustrated in FIG. 1). The solid rivet comprises a projected surface S1 in the same plan. The projected surface S2 is that surface formed by the shank 14 and the head 12, including the transition region.

The self-piercing rivet 10 is used in a self-piercing riveted joint, as shown in FIG. 2. The self-piercing riveted joint comprises an upper workpiece C1 and a lower workpiece C2 from which at least one is realized from a metal, and notably in an aluminium alloy. The head 12 abuts against the upper workpiece C1. The lower side of the rivet shank is upset and a spreading of the recess geometry of the rivet in the workpiece occurs. A clean cutting process through the cutting line is performed in the first workpiece.

The self-piercing rivet 10 of the invention, as depicted in FIG. 2, does not comprise a determined spreading due to a thin defined cutting edge (as known for the self-piercing rivet of the state of the art), but the connection or joining of the two workpieces in made through upsetting the rivet by a die in its lower area and the spreading of the rivet through the recess geometry with determined taper surfaces. The self-piercing rivet with the geometry shown in FIG. 1 allows to perform a clean cutting in the joining operation. The internal geometry allows the workpiece material to "slide" and thus forms an internal pressure. The spreading is assisted through the straight upsetting.

Although exemplary embodiments of the present invention have been shown and described, it will be appreciated by those skilled in the art that changes may be made to these embodiments without departing from the principles and spirit of the invention, the scope of which is defined in the appended claims and their equivalents

What is claimed is:

1. A self-piercing rivet comprising:
    a head and a foot end opposite the head;
    a shank with a shank diameter (Ds), and partially defining an axial recess closed at one end with an axial depth (LB) and the axial recess has a recess volume;
    an annular piercing edge; and
    wherein a ratio of the recess volume to a volume of the shank and the head is in the range of 0.06 to 0.08.

2. The self-piercing rivet according to claim 1, wherein the annular piercing edge includes an outer edge, and wherein the outer edge is a sharp-edged with a radius of less than 0.2 mm.

3. The self-piercing rivet according to claim 1, wherein the rivet, in its final manufactured state, is a cold formed part without any heat or surface treatment.

4. The self-piercing rivet according to claim 1, wherein the axial recess is arc-shaped.

5. The self-piercing rivet according to claim 1, wherein a ratio of the axial depth (LB) to the shank diameter (Ds) is in the range of 0.05 to 0.66.

6. The self-piercing rivet according to claim 1, wherein the annular piercing edge has a piercing diameter (Dp) and the ratio of the piercing diameter (Dp) to the shank diameter (Ds) is in the range of 0.85 to 0.99.

7. The self-piercing rivet according to claim 1, wherein the rivet is made of one of steel or stainless steel or aluminum alloy.

8. The self-piercing rivet according to claim 1, wherein the rivet is made of 37MnB4.

9. The self-piercing rivet according to claim 1, wherein the rivet is made from a wire having a strength of 750 MPa.

10. The self-piercing rivet according to claim 1, and further comprising a first section proximate to the head and a second section proximate to the annular piercing edge, and wherein the material strength of the second section is less than the material strength of the first section.

11. The self-piercing rivet according to claim 1, wherein the axial recess is at least partly conical or frustroconical, such that the axial recess comprises a conical tapered surface, and wherein the conical tapered surface has an inclusive angle in cross section in the range of 75 degrees to 105 degrees.

12. A riveted joint comprising:
    a first workpiece;
    a second workpiece made from a metal;
    a self-piercing rivet; and
    wherein the self-piercing rivet in its undeformed condition included:
        a head and a foot end opposite the head;
        a shank with a shank diameter (Ds) and partially defining an axial recess closed at one end with an axial depth (LB), and the axial recess has a recess volume;
        an annular piercing edge; and
        wherein a ratio of the recess volume to a volume of the shank and the head is in the range of 0.06 to 0.08; and
    wherein when joined the head abuts against one of the first or the second workpiece.

13. The riveted joint according to claim 12, wherein the second workpiece is made of an aluminum alloy.

14. The riveted joint according to claim 12, wherein the self-piercing rivet in its undeformed condition the annular piercing edge includes an outer edge, and wherein the outer edge is a sharp-edged with a radius of less than 0.2 mm.

15. The riveted joint according to claim 12, wherein the self-piercing rivet in its undeformed condition had a ratio of the axial depth (LB) to the shank diameter (Ds) is in the range of 0.05 to 0.66.

16. The riveted joint according to claim 12, wherein the self-piercing rivet in its undeformed condition the annular piercing edge had a piercing diameter (Dp) and the ratio of the piercing diameter (Dp) to the shank diameter (Ds) is in the range of 0.85 to 0.99.

17. The riveted joint according to claim 12, wherein the self-piercing rivet is made of 37MnB4.

18. The riveted joint according to claim 12, wherein the self-piercing rivet is made from a wire having a strength of 750 MPa.

19. The riveted joint according to claim 18, wherein the self-piercing rivet, in its final manufactured state, is a cold formed part without any heat or surface treatment.

20. The riveted joint according to claim 12, wherein the self-piercing rivet in its undeformed condition the axial recess is at least partly conical or frustroconical, such that the axial recess comprises a conical tapered surface, and wherein the conical tapered surface has an inclusive angle in cross section of in the range of 75 degrees to 105 degrees.

* * * * *